United States Patent
Ahmed et al.

(10) Patent No.: US 11,615,107 B2
(45) Date of Patent: Mar. 28, 2023

(54) AUTOMATIC GENERATION OF MATERIALIZED VIEWS

(71) Applicant: Oracle International Corporation, Redwood Shores, CA (US)

(72) Inventors: Rafi Ahmed, Fremont, CA (US); Randall Bello, Hampton, NH (US); Andrew Witkowski, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 474 days.

(21) Appl. No.: 16/523,872

(22) Filed: Jul. 26, 2019

(65) Prior Publication Data

US 2021/0026847 A1 Jan. 28, 2021

(51) Int. Cl.
G06F 16/00 (2019.01)
G06F 16/248 (2019.01)
G06F 16/2453 (2019.01)
G06F 16/242 (2019.01)

(52) U.S. Cl.
CPC ........ *G06F 16/248* (2019.01); *G06F 16/2438* (2019.01); *G06F 16/24544* (2019.01)

(58) Field of Classification Search
CPC ............. G06F 16/2393; G06F 16/2438; G06F 16/24539; G06F 16/24544; G06F 16/248
USPC .................................................. 707/600–899
See application file for complete search history.

(56) References Cited

U.S. PATENT DOCUMENTS

| | | | |
|---|---|---|---|
| 7,191,169 B1 * | 3/2007 | Tao .................... | G06F 16/24539 707/999.102 |
| 8,996,502 B2 * | 3/2015 | Folkert ............. | G06F 16/24539 707/717 |
| 9,727,608 B2 * | 8/2017 | Cheng ............... | G06F 16/24542 |
| 11,243,956 B1 * | 2/2022 | Papakonstantinou ........................ G06F 16/24565 |
| 2007/0226264 A1 * | 9/2007 | Luo .................... | G06F 16/24535 |

(Continued)

OTHER PUBLICATIONS

Zhou et al., "Efficient Exploitation of Similar Subexpressions for Query Processing" Proceedings of the ACM SIGMOD, International Conference on Management of Data, dated Jun. 2007, ACM, pp. 553-544.

(Continued)

*Primary Examiner* — Michelle N Owyang
(74) *Attorney, Agent, or Firm* — Hickman Becker Bingham Ledesma LLP

(57) ABSTRACT

Definitions of material views are automatically generated. In general, Automated MV generation identifies a set of candidates MVs by examining a working set of query blocks. Once the candidates are formed, the candidate MVs are further evaluated to calculate a benefit to the candidate MVs. An improved approach for generating a candidate set of MVs is described herein. The improved approach is referred to as the extended covering subexpression technique (ECSE). Under ECSE, various relationships between join sets other than strict equivalence are used to generate new resultant join sets. Such relationships include subset, intersection, superset, and union, which shall be described in further detail below. In some cases, relationships among resultant join sets and initial join sets are considered to generate new resultant join sets. The final resultant join sets are then used to form a candidate set of MVs.

18 Claims, 13 Drawing Sheets

(56) References Cited

U.S. PATENT DOCUMENTS

2009/0319476 A1\* 12/2009 Olston .............. G06F 16/24539
2021/0019318 A1\* 1/2021 Leung ............... G06F 16/24537
2021/0303539 A1 9/2021 Zait et al.

OTHER PUBLICATIONS

Ahmed, et al. "Automatic Generation of Materialized Views in Oracle". Oct. 29, 2018, pp. 1-11.

\* cited by examiner

Relationship between tables F, D1 and D5 in query block Q4

Relationship between tables F and D1 in query block Q5

FIG. 4C

```
Algorithm ECSE (QBlst)
{
    For each QB in QBlst do: discard the QB if the number of tables it contains is lower than 2.
    Generate join graphs for each query block and identify fact, dimension and branch tables in the
    join graph, detect invariant joins (if any), and perform join graph partitioning and reduction (i.e.,
    heuristic A), if required.

Divide QBlst into sub-lists such that each sub-list contains join graphs that have a common fact
    table.

For each sub-list of QBlst do
        Create lists ALST and NLST;
        Derive join sets and QB sets from the join graphs and insert them into ALST;
        For each item X in ALST do
        {
            For each item Y in ALST do
            {
                If (X > Y ∧ X.jnset = Y.jnset)
                {
                    X.qbset = X.qbset ∪ Y.qbset;
                    Remove Y from ALST;
                }
                Else if (X > Y ∧ Y.jnset ⊄ X.jnset ∧ X.jnset ⊄ Y.jnset ∧ | X.jnset ∩ Y.jnset | ≥ 1)
                {
                    Z.jnset = X.jnset ∩ Y.jnset;
                    Z.qbset = X.qbset ∪ Y.qbset;
                    Insert Z into NLST;
                }
            }
        }
        Append NLST to ALST;
        Do {
            For each item X in ALST do
                For each item Y in ALST do
                {
                    If (X > Y ∧ Y.jnset ⊄ X.jnset ∧ X.jnset ⊄ Y.jnset ∧ X.jnset ∩ Y.jnset ≠ ∅ ∧
                        ∀T ∈ (X.jnset ∪ Y.jnset) – (X.jnset ∩ Y.jnset), Invariant (X.jnset ∩ Y.jnset, T))
                    {
                        Z.jnset = X.jnset ∪ Y.jnset;
                        Z.qbset = X.qbset ∪ Y.qbset;
                        Insert Z into ALST;
                    }
                }
        } While (ALST changes);
```

FIG. 4D

```
For each item X in ALST do
   For each item Y in ALST do
   {
      If (X > Y ∧ X.inset = Y.inset)
      {
         X.obset = X.obset ∪ Y.obset
         Remove Y from ALST;
      }
   }
For each item X in ALST do
   For each item Y in ALST do
   {
      If (X.inset ⊂ Y.inset)
         X.obset = X.obset ∪ Y.obset
      Else if (Y.inset ⊂ X.inset ∧ ∀ T ∈ (X.inset − Y.inset), Invariant (Y.inset, T))
         X.obset = X.obset ∪ Y.obset
   }
            For each item X in ALST do
            {
               If (| X.inset | < Ψ ∨ | X.obset | < β)
               {
                  Remove X from ALST;
                  Continue;
               }
               For each item Y in ALST do
                  If (X.inset ⊂ Y.inset ∧ X.obset ⊂ Y.obset)
                     Remove X from ALST;
            }
            For each item X in ALST do
            {
               If (~HeuristicsE (X) ∨ ~HeuristicsF(X))
                  Remove X from ALST;
            }
            apply OPTGG;
         }
```

AUTOMATIC GENERATION OF MATERIALIZED VIEWS

FIELD OF THE TECHNOLOGY

The present invention relates to the field of database management, in particular to automatic generation of materialized views (MV).

BACKGROUND

In a database management system (DBMS), materialized views are essential features for database performance. An optimal mix of materialized views minimizes resource utilization (CPU and IO) when fetching a relatively small amount of data from very large tables and increases application throughput.

Because of the importance of materialized views, identifying an optimal mix of materialized views is an important task. In general, identifying an optimal mix of materialized views includes identifying a small number of materialized views, which are of reasonable size, contain large precomputation of joins and grouping, and can rewrite a substantial number of workload queries.

Identifying materialized views may be performed manually. However, manually identifying materialized views requires extensive knowledge of the structure of the database, of the workload of query and of the internal operations of a DBMS. Developers need to spend a significant amount of time and effort identifying materialized views manually, identifying which materialized views to create, indexing the materialized views, updating them, and advising their users on which ones to use.

Described herein are techniques for the automatic generation of materialized views. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings of certain embodiments in which like reference numerals refer to corresponding parts throughout the figures:

FIG. 4C and FIG. 4D together provide an example of the ECSE algorithm.

DETAILED DESCRIPTION

Figure 1:
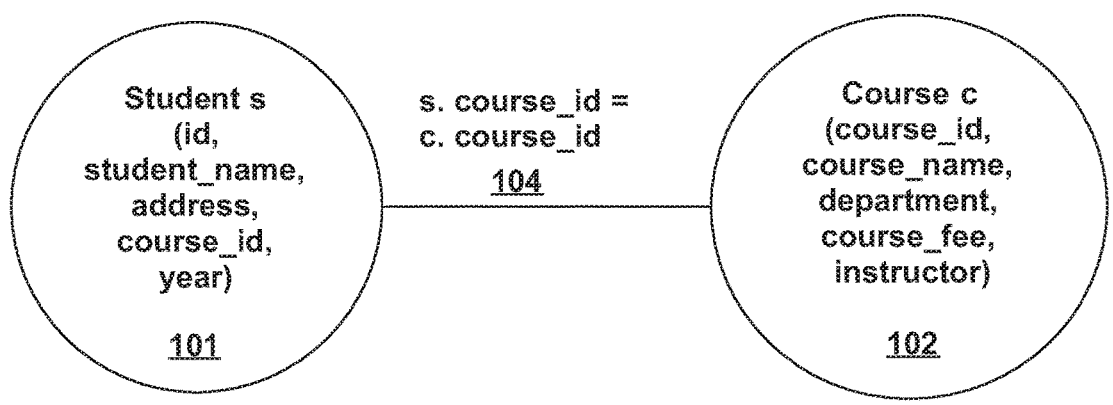
FIG. 1 depicts an example join graph of a given query block.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

Techniques are described herein for the automatic generation of materialized views. Such techniques are referred to herein as Automated MV generation.

In general, Automated MV generation identifies a set of candidates MVs by examining a working set of query blocks. Once the candidates are formed, the candidate MVs are further evaluated to calculate a benefit to the candidate MVs.

The calculation of the benefit takes into account such factors as the storage cost and the maintenance cost of the MV. Another important factor taken into account is the query execution cost savings realized by performing an MV rewrite for one or more queries in the working set. In addition, the more queries for which an MV rewrite using a particular MV results in query execution cost savings, the more benefit provided by the MV.

One approach for generating a candidate set of MVs is referred to herein as covering sub-expression technique (CSE). In CSE, relationships between join graphs that are full equivalence are used to generate new resultant join sets. Resultant join sets are then used to form a candidate set of MVs. For example, an equivalence join set operation may be applied on a pair of constituent join sets and their corresponding query block sets in a working set when the constituent join sets are equivalent. A resultant join set, representing an MV, can be used to rewrite both constituent query block sets. In this case, the join graph of the resultant join set is equivalent with the respective join graph of each constituent join sets.

An improved approach for generating a candidate set of MVs is described herein. The improved approach is referred to as the extended covering subexpression technique (ECSE). Under ECSE, various relationships between join sets other than strict equivalence are used to generate new resultant join sets. Such relationships include subset, intersection, superset, and union, which shall be described in further detail below. In some cases, relationships among resultant join sets and initial join sets are considered to generate new resultant join sets. The final resultant join sets are then used to form a candidate set of MVs. For example, an intersection join set operation may be applied on a pair of constituent join sets and a corresponding pair of constituent query block sets in a working set when the respective constituent join sets intersect. A resultant join set, representing an MV, can be used to rewrite both constituent query block sets. Here the resultant join set is not equivalent with either of the constituent join sets.

Key Definitions and Concepts

Query Block

A query block is the basic unit of Structured Query Language (SQL) statement that specifies a projection operation (e.g. columns specified in a SELECT clause) on tables, inline views or views referenced by a FROM clause, and may specify additional operations on the tables and views such as joining and grouping. A query block may be nested within a query block.

Provided below is an example of a query block nested within another query block.

SELECT e. name, e. salary
FROM (SELECT *
    FROM emp e
    WHERE e. salary>5000)

In the above example, the query contains two query blocks. The nested query block, which is an inline view, contains SQL statements SELECT*FROM emp e WHERE e. salary>5000, which projects all fields from table emp e when salary is greater than 5000. The main query block contains SQL statements SELECT e. name, e. salary FROM ('the nested query block'), which projects the name and salary fields from the result of the nested query block.

Join Graph

A join graph is a graph structure representing all joins specified in a query block. The join graph comprises edges between nodes, each of the nodes representing a table, each of the edges representing a join between two tables to which the edges are connected and representing properties of the join, such as particular join type (e.g., inner, outer, etc.) and a particular join condition, which comprises one or more join predicates.

Provided below is an example of a query block. FIG. 1 depicts the join graph of the given query block.

SELECT s. student_name, s. address, c. course_name
FROM student s, course c
WHERE   s.   year=2018   and   c. department='MATHEMATICS' and s. course_id=c. course_id Referring to FIG. 1, node 101 represents table student 's' ('s" is an alias of the student table), which contains columns id, student_name, address, course_id, and year; node 102 represents table course 'c', which contains columns course_id, course_name, department, course_fee, and instructor. Edge 104 represents an inner join between table student 's' and table course 'c' based on join condition or join predicate s.course_id=c.course_id.

Join Set

A join set is an abstraction of a join graph that is based on one or more query blocks. A join set is essentially a set of join edges. In a join graph, tables (or views) form vertices (or nodes). A join condition between two tables forms a join edge between the two vertices. A join edge may comprise one or more join predicates. For example, consider the following query block.

SELECT*
FROM T1, T2, T3
WHERE T1.x=T2.y and T1.a>T2.b

The join graph for this query block has three vertices: T1, T2, and T3. There is a single join edge between T1 and T2, which is represented by a set of join predicates: {T1.x=T2.y, T1.a>T2.b}.

If a join set comprises a single table, then an empty or dummy join edge between the same table is added to the join set. A join set allows set operations to be applied to its underlying join graph. A join set is associated with a corresponding query block set, which represents a set of query blocks that can be potentially re-written in terms of an MV based on the join set, that is, the join graph of the join set.

A join set and its associated query block set may be herein denoted as [join set, query block set]. For example, [{F1, D2, D3, D6}, {Q5, Q7}] represents join set {F1, D2, D3, D5} and its associated query block set {Q5, Q7}. The join set {F1, D2, D3, D6} contains tables F1, D2, D3, and D6 and their join edges (although join edges are not shown in the examples); its associated query block set contains query blocks Q5 and Q7, which can be potentially re-written in terms of an MV based on the join set {F1, D2, D3, D6}. A query block set that may be rewritten using the MV based on a join set may be referred to herein as being able to be rewritten using join set.

Join Set Operation

Under ECSE, set operations are applied to constituent join sets to form a resultant join set; set operations when applied to constituent join sets take into consideration tables as well as join edges The join set operation uses a set-based relationship between constituent join sets to generate the resultant join set such that all associated query block sets of the constituent join sets may be rewritten in terms of an MV based on the resultant join set. The union of the associated query block sets of the constituent join sets is the query block set associated with the resultant join set.

Provided below are two constituent join sets and their associated query block sets. In this simple example, the equivalence join set operation is performed to form a resultant join set representing a potential MV with which both query blocks may be rewritten.

Q1:
SELECT F.n, SUM(F.m), D1.m
FROM F, D1
WHERE F.f=D1.p and F.x=6 and D1.y=25
GROUP BY F.n, D1.m;
[{F, D1}, {Q1}]
Q2:
SELECT F.y, COUNT(F.m), D1.h
FROM F, D1
WHERE F.f=D1.p and F.x=11 and D1.y=33
GROUP BY F.y, D1.h;
[{F, D1}, {Q2}]
[{F, D1}, {Q1, Q2}]
Create materialized view MV1 . . . AS
SELECT F.n, SUM(F.m), COUNT(F.m), D1.m, F.y, D1.h, F.x, D1.y
FROM F, D1
WHERE F.f=D1.p and F.x IN (6, 11) and D1.y IN (25, 33)
GROUP BY F.n, D1.m, F.y, D1.h, F.x, D1.y;

In the above example, query block Q1 contains SQL statements SELECT F.n, SUM(F.m), D1.m FROM F, D1 WHERE F.fk=D1.p and F.x=6 and D1.y=25 GROUP BY F.y, D1.h. The SELECT statement projects columns F.n, SUM(F.m), and D1. m from tables F and D1 when condition F.x=6 and D1.y=25 are satisfied. The GROUP BY statement groups results based on column F.n, D1.m, and F.m. Join set {F, D1} has a join graph involving tables F and D1 and can be used to rewrite query block set {Q1}.

Similarly, query block Q2 contains SQL statements SELECT F.y, COUNT(F.m), D1.h FROM F, D1 WHERE F.f=D1.p and F.x=11 and D1.y=33 GROUP BY F.y, D1.h. The SELECT statement projects column F.y, COUNT(F.m), D1.h from tables F and D1 when condition F.x=11 and D1.y=33 are satisfied. The GROUP BY F.m statement groups the results based on column F.y, and D1.h. Join set {F, D1} has a join graph involving table F and D1 and can be used to rewrite query block set {Q2}.

Since the two join sets are the same, the equivalence join set operation can be used to form a resultant join set {F, D1}. The resultant join set represents a potential MV1, which has a join graph involving tables F and D1 and can be used to rewrite both query blocks Q1 and Q2. In the above example, the given join set operation uses SELECT F.n, SUM(F.m), COUNT(F.m), D1.m, F.y, D1.h, Fx, D1.y statement to merge projected columns in query blocks Q1 and Q2. The predicate F.x IN (6, 11) in MV1 unifies the predicate F.x=6 in query block Q1 and the predicate F.x=11 in query block Q2. Similarly, the predicate D1.y IN (25, 33) in MV1 unifies the predicate D1.x=25 in query block Q1 and the predicate D1.y=33 in query block Q2. The GROUP BY F.m statement groups results based on column, F.n, D1.m, F.y, D1.h, Fx, and D1.y. The join set operation unifies predicates and merges projected columns in query blocks Q1 and Q2. Thus, an MV based on the join set {F, D1} could be used to rewrite both query blocks Q1 and Q2.

Notations

For the sake of brevity, the notation ⋈ is used for inner join and ⋉ is used for left outer-join. T1 ⋉ T2 indicates that T2 is the outer-joined table and T1 is on the left of this outer-join. A join set represents a join graph in one or more query blocks; it is defined at the beginning of section JOIN SET and is explained in greater detail below.

The notation ( ) is used for an ordered list, { } is used for a set, [ ] is used for a composite structure, and |S| is used for cardinality (i.e., the number of elements) of set S. The notation ∅ is used for an empty set, ∈ is used for a set membership. A ∈ B denotes A is an element of set B. The notation ∀ is used for universal quantifier. ∀ T denotes for all elements of T.

The notation ⊂ is used for a proper subset. A proper subset is a subset that is not identical to the original set—it contains fewer join edges. B ⊂ A denotes that B is a proper subset of A. Notation ⊈ is used for non-containment of sets. B ⊈ denotes that B is neither a subset of nor equal to A.

The notation = is used for equivalence. When join set B is equivalent to join set A, the relationship between join sets B and A can be denoted as B=A or as A=B.

The notation ∩ is used for intersection. The intersection of two join sets A and B can be denoted as A ∩ B, which is the join set that contains all join edges of A that also belong to B and vice versa, but nothing else.

The notation ⊇ is used for superset. A superset of a join set A is another join set that contains all join edges from join set A, but also contains other join edges. When join set B is a superset of join set A, the relationship between join sets B and A can be denoted as B ⊇ A The notation ∪ is used for union. A union of two join sets A and B is another join set that contains all join edges that are present in both the join sets A and B. A ∪ B denotes that the union of A and B.

The notation ⊆ is used for subset. A subset of a join set A is another set that contains only join edges of join set A, but may not contain all join edges of A. When join set B is a subset of join set A, the relationship between join sets B and A can be denoted as B ⊆ A.

The notation ∧ is used for AND relationship, ∨ is used for OR relationship. The statement A ∧ B is true if both A and B are true; if either is false, the statement is false. The statement A ∨ B is true if either A or B is true; if and only if both are false, the statement is false.

The column names pk and fk are used for a column that is a foreign key and primary key respectively. Thus, T1.pk represents a primary key of table T1 and T2.fk represents a foreign key of table T2.

Invariant Join

In general, X is invariant with respect to its join with table T, if the join produces exactly one row for each row in X; that is, the join does not duplicate or eliminate any row of X. Here X is either a table or a join set. The invariance of X with respect to T is denoted by Invariant (X, T). Whether a table in a join is invariant can be derived from the properties of join edges involved in the join.

Table T1 is in an invariant join with respect to its join with table T2, if the following four conditions are satisfied:

1. The join is an equi-inner join with the join condition T1.fk=T2.pk, where T1.fk is a foreign key referencing the primary key T2.pk;

2. The column T1.fk has a non-null constraint;

3. Either the query block does not contain any filter or subquery predicates on T2 or these predicates are not included in the resulting join set.

4. Either T2 is invariant in joins with tables other than T1 specified in the query block, if any, or the other tables are not included in the resulting join set.

As shall be explained in greater detail, the presence of invariant joins is used to generate a join set that is a union or superset of underlying join sets thereby allowing materialized views to contain larger pre-computations.

Provided below is an example of an invariant join.

Q4:
SELECT F.a, D1.a, D5.a
FROM F, D1, D5
WHERE F.fk1=D1.pk1 and F.fk2=D5.pk1
GROUP BY F.a, D1.a, D5.a;
[{F, D1, D5}, {Q4}]

Figure 2:
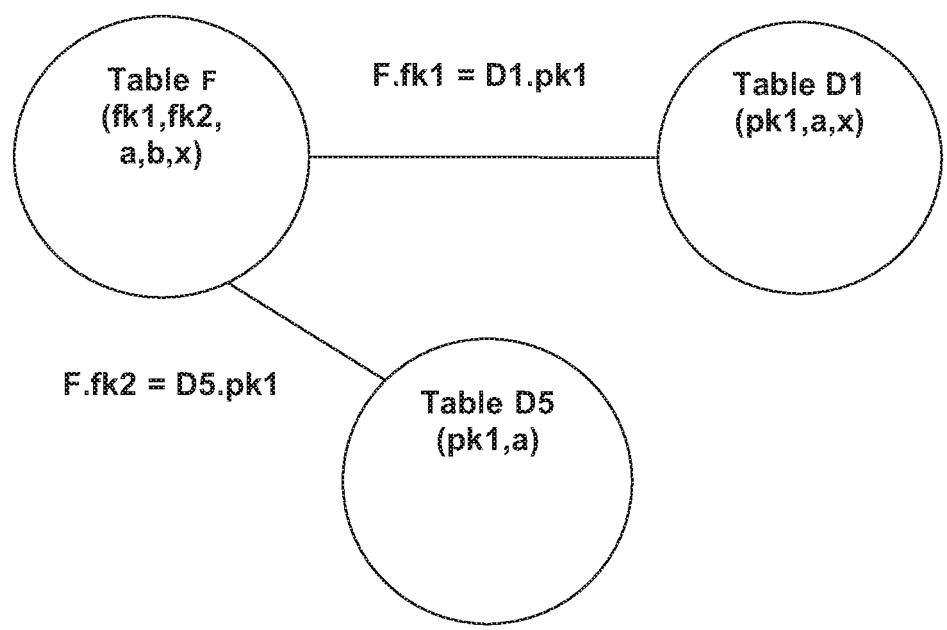
FIG. 2 is a diagram illustrating an invariant join.

FIG. 2 depicts the relationship between tables F, D1 and D5 in query block Q4.

The column fk1 is a non-null foreign key in table F that reference primary key pk1 in table D1. Table F and D1 are joined based on condition F.fk1=D1.Pk1. This is an example where F participates in an invariant join with D1. The column fk2 is a non-null foreign key in table F that reference primary key pk1 in table D5. Table F and D5 are joined based on condition F.fk2=D5.pk1. In addition, the invariant join F.fk1=D1.pk1 guarantees that all rows of F are retained without duplication in its join with table D1; similarly, the invariant join F.fk2=D5.pk1 guarantees that all rows of F are retained without duplication in its join with table D5.

In contrast, provided below is an example of a non-invariant join.

Q5:
SELECT F.a, F.b, D1.a
FROM F, D1
WHERE F.fk1=D1.pk1
GROUP BY F.a, F.b, D1.a;
[{F, D1}, {Q5}]

Figure 3:
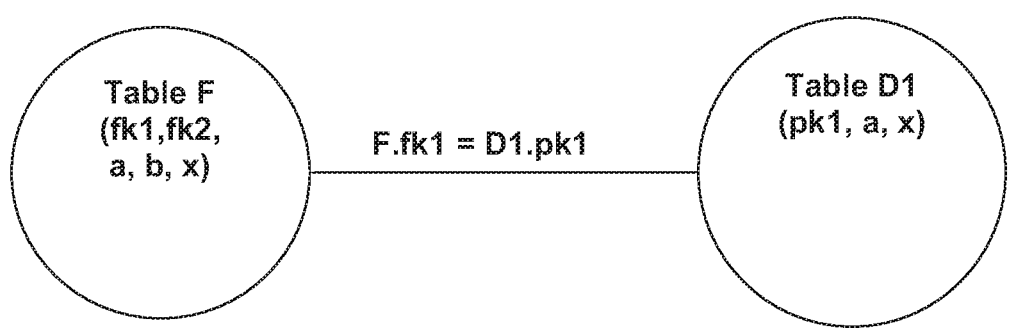
FIG. 3 is a diagram illustrating a variant join.

FIG. 3 depicts the relationship between tables F and D1 in query block Q5, and the relationship between tables F, D1, and D5 in query block Q6.

In query block Q5, F.fk1, the foreign key, does not have a non-null constraint, although the foreign key fk1 in table F references primary key pk1 in table D1. This violates Rule #2 in [0058]. Thus, table F is not invariant in its join with D1.

Equivalence

Two join sets are considered equivalent if the join graphs of the two join sets are equivalent. When join set A is equivalent to join set B, then one of the join sets can be pruned.

When join set B equivalent to join set A, the relationship between join sets B and A can be denoted as B=A.

Provided below is an example of an equivalence join set operation that prunes a join set.

Q7:
SELECT F.n, F.g, SUM(F.m1), D7.y, D2.z
FROM F, D7, D2
WHERE F.f1=D7.p and F.f2=D2.p and F.x IN (4,6) and D7.c=25
GROUP BY F.n, F.g, D7.y, D2.z;
[{F, D7, D2}, {Q7}]
Q8:
SELECT F.n, AVG(F.m2), D7.p, D2.y
FROM F, D7, D2
WHERE F.f1=D7.k and F.f2=D2.p and F.x=9 and D7.c=5
GROUP BY F.n, D7.p, D2.y;
[{F, D7, D2}, {Q8}]
[{F, D7, D2}, {Q7, Q8}]
Create materialized view MV2 . . . AS
SELECT F.n, F.g, D7.y, D2.z, D7.p, D2.y, F.x, D7.c, AVG (F.m2), SUM(F.m1)
FROM F, D7, D2
WHERE F.f1=D7.p and F.f2=D2.p and F.x IN (4,6, 9) and D7.c IN (5, 25)
GROUP BY F.n, F.g, D7.y, D2.z, D7.p, D2.y, F.x, D7.c;

In the above example, join set {F, D7, D2} is associated with query block set {Q7} and has a join graph involving tables F, D7, and D2 and their join edges. Similarly, join set {F, D7, D2} is associated with query block set {Q8}, and has a join graph involving tables F, D7, and D2 and their join edges. Since join set {F, D7, D2} associated with query block Q7 and join set {F, D7, D2} associated with query block Q8 contain the same set of tables and identical join predicates joining these tables (i.e., their join graphs are the same), equivalence set operation can be applied to prune one of the join sets, and the remaining join set can be used to rewrite both query blocks Q7 and Q8 into an MV.

The equivalence join set operation includes unification of filter predicates and merging of select and group-by lists, which creates MV2 that can be used to rewrite both query blocks Q7 and Q8. In the above example, the predicate F.x IN (4,6, 9) in MV2 unifies the predicate F.x IN (4,6) in query block Q7 and the predicate F.x=9 in query block Q8. Similarly, the predicate D7.c IN (5, 25) in MV2 unifies the predicate D7.c=5 in query block Q7 and the predicate D7.c=25 in query block Q8. The equivalence join set operation also uses statement SELECT F.n, F.g, D7.y, D2.z, D7.p, D2.y, F.x, D7.c, AVG(F.m2), SUM(F.m1), SUM(F.m1) to merge projected columns in query blocks Q7 and Q8.

Intersection

The intersection of two join sets A and B can be denoted as A ∩ B, which is the join set that contains all join edges of A that also belong to B and vice versa, but nothing else.

In one embodiment, an intersection set operation may be applied on join sets when the respective join graphs intersect.

More specifically, the intersection join set operation may be applied to generate a resultant join set and a resultant query block set associated with the resultant join set when there are join edges that are common to both the constituent join sets. The join edges that are common to both constituent join set are established as the resulting join and its associated query block set is a union of query block set of the constituent join sets.

Provided below is an example of an intersection join set operation that generates a resultant join set representing an MV.

Q9:
SELECT F.n, SUM(F.m1), D7.y, D2.z
FROM F, D7, D2
WHERE F.f1=D7.p and F.f2=D2.p and F.x IN (4,6) and D7.c=25
GROUP BY F.n, D7.y, D2.z;
[{F, D7, D2}, {Q9}]
Q10:
SELECT F.y, COUNT(F.m2), D1.h
FROM F, D7, D3
WHERE F.f1=D7.p and F.f3=D3.p and F.x=11 and D3.w>11
GROUP BY F.y, D7.h;
[{F, D7, D3}, {Q10}]
[{F, D7}, {Q9, Q10}]
Create materialized view MV3 . . . AS
SELECT F.n, F.y, D7.y, D7.h, D7.c, F.x, F.f2, F.f3, COUNT (F.m2), SUM(F.m1)
FROM F, D7
WHERE F.f1=D7.p and F.x IN (4, 6, 11)
GROUP BY F.n, F.y, F.x, D7.y, D7.h, D7.c, F.f2, F.f3;

In the above example, join set {F, D7, D2} is associated with query block set {Q9} and has a join graph involving tables F, D7, and D2 and their join edges. Similarly, join set {F, D7, D3} is associated with query block set {Q10} and has a join graph involving tables F, D7, and D3 and their join edges. The join sets {F, D7, D2} and {F, D7, D3} both contain tables F and D7 and identical join predicate (i.e., F.f1=D7.p) joining F and D7. Thus, the intersection join set operation can be applied to form a resultant join set representing MV3, which can be used to rewrite both query blocks Q9 and Q10.

MV3 is formed by unification of filter predicates and meagering of projected columns and group-by lists in the query blocks, thereby allowing MV3 to be used to rewrite both query blocks Q9 and Q10. In the above example, the predicate F.x IN (4, 6, 11) in MV3 unifies the predicate F.x IN (4,6) in query block Q6 and the predicate F.x=11 in query block Q9. The above join set operation also uses statement SELECT F.n, F.y, D7.y, D7.h, D7.c, F.x, F.f2, F.f3, COUNT(F.m2), SUM(F.m1) to merge projected columns in query blocks Q9 and Q10.

Subset

A subset of a join set A is another set that contains only join edges from the join set A, but may not contain all join edges of A. When join set B is a subset of join set A, the relationship between join sets B and A can be denoted as B ⊆ A, which means join set B contains only some of join edges of join set A.

In one embodiment, a subset join set operation may be applied when one join set is a subset of another join set. The join set that is a subset of another join set is established as the resulting join set and its associated query block set is a union of query block sets of the constituent join sets.

More specifically, the subset join set operation may be applied to rewrite a query block set associated with the first constituent join set when the first constituent join set includes all tables involved in the second constituent join set; the second constituent join set includes at least a join edge not involved in the first constituent join set.

Provided below is an example of a subset join set operation that generates a resultant join set representing an MV.

Q11:
SELECT F.x, D1.y, D2.z, SUM(F.m1)
FROM F, D1, D2
WHERE F.f1=D1.k and F.f2=D2.k and F.y=5 and D1.c=9 and D2.s<25
GROUP BY F.x, D1.y, D2.z;
[{F, D1, D2}, {Q11}]
Q12:
SELECT F.x, D1.h, COUNT(F.m2)
FROM F, D1
WHERE F.f1=D1.k and F.y=7 and D1.g=7 and D1.c=33
GROUP BY F.x, D1.h;
[{F, D1}, {Q12}]
[{F, D1}, {Q11, Q12}]
Create materialized view MV4 . . . AS
SELECT F.x, D1.y, D1.h, D1.c, D1.g, F.y, F.f2, COUNT (F.m2), SUM(F.m1)
FROM F, D1
WHERE F.f1=D1.k and D1.c IN (9, 33) and F.y IN (5, 7)
GROUP BY F.x, F.y, D1.y, D1.h, D1.c, D1.g, F.f2;

In the above example, join set {F, D1, D2} is associated with query block set {Q11} and has a join graph involving tables F, D1, and D2 and their join edges. Similarly, join set {F, D1} is associated with query block set {Q12} and has a join graph involving tables F and D1 and their join edges. Join set {F, D1} contains only tables from join set {F, D1, D2}, but does not contain all tables. Thus, join set {F, D1} is a subset of join set {F, D1, D2} and in both the join sets the join predicate joining F and D1 are identical. Therefore, the subset join set operation can be applied to generate a resultant join set representing MV4, that can be used to rewrite both query blocks Q11 and Q12.

MV4 is formed by unification of filter predicates and merging of select and group-by lists, thereby allowing MV4 to be used to rewrite both query blocks Q11 and Q12. In the above example, the predicate D1.c IN (9, 33) in MV4 unifies the predicate D1.c=9 in query block Q11 and the predicate D1.c=33 in query block Q12. Similarly, the predicate F.y IN (5, 7) in MV4 unifies the predicate F.y=5 in query block Q11 and the predicate F.y=7 in query block Q12. The above join set operation also uses statement SELECT F.x, D1.y, D1.h, D1.c, D1.g, F.y, F.f2, COUNT(F.m2), SUM(F.m1) to merge projected columns in query blocks Q11 and Q12.

Superset

A superset of a join set A is another join set that contains all join edges from join set A, but also contains other join edges. When join set B is a superset of join set A, the relationship between join sets B and A can be denoted as $B \supseteq A$, which means join set B contains all join edges from join set A but may also contain other join edges.

In one embodiment, a superset join set operation may be applied when a first join set is a superset of a second join set and is invariant with respect to the second join set. The superset join set is identified as the resulting join set. The resultant join set is not equivalent with one constituent join set of the two constituent join sets.

More specifically, the superset join set operation may be applied to rewrite a query block set associated with the first constituent join set when the first join set includes all join edges involved in the second join set and the first join set includes at least one join edge not involved in the second join set. The join set that is a superset of another join set is established as the resulting join set and its associated query block set is a union of query block sets of the constituent join sets.

Provided below is an example of a superset join set operation that generates a resultant join set representing an MV.

Q13:
SELECT F.n, SUM(F.m1), D1.m
FROM F, D1
WHERE F.f1=D1.k and F.x=6 and D1.y=25
GROUP BY F.n, D1.m;
[{F, D1}, {Q13}]
Q14:
SELECT F.y, MIN(F.m2), D1.h, D5.z
FROM F, D1, D5
WHERE F.f1=D1.k and F.fk5=D5.pk and F.x=11 and D1.y=33 and D5.g>6
GROUP BY F.y, D1.h, D5.z;
[{F, D1, D5}, {Q14}]
[{F, D1, D5}, {Q13, Q14}]
Create materialized view MV5 . . . AS
SELECT F.n, F.y, D1.m, D1.h, D5.z, D1.y, D5.g, F.x, MIN(F.m2), SUM(F.m1)
FROM F, D1, D5
WHERE F.f1=D1.k and F.fk5=D5.pk and F.x IN (6, 11) and D1.y IN (25, 33)
GROUP BY F.n, F.y, F.x, D1.y, D1.m, D1.h, D5.z, D5.g;

In the above example, join set {F, D1} is associated with query block set {Q13} and has a join graph involving tables F and D1 and their join edges. Similarly, join set {F, D1, D5} is associated with query block set {Q14} and has a join graph involving tables F, D1, and D5 and their join edges. In query block Q11, table F and D5 are joined based on join condition F.fk5=D5.pk. In both query blocks Q13 and Q14, table F and D1 are joined based on join condition F.f1=D1.pk. Here, the join between join set {F, D1} and D5 is an invariant join, which may be denoted as Invariant ({F, D1}, D5).

Join set {F, D1} contains only tables from join set {F, D1, D5}, but does not contain all tables. Thus, the join set {F, D1} is a subset of join set {F, D1, D5}. Because join set {F, D1} is invariant with respect to its join with table D5, the superset join set operation can be used to form a resultant join set representing MV5 that may be used to rewrite both query blocks Q13 and Q14.

MV5 is formed by unification of filter predicates and merging of select and group-by lists, which enables MV5 to be used to rewrite both query blocks Q13 and Q14. In the above example, the predicate F.x IN (6, 11) in MV5 unifies the predicate F.x=6 in query block Q13 and the predicate F.x=11 in query block Q14. Similarly, the predicate D1.y IN (25, 33) in MV5 unifies the predicate D1.y=25 in query block Q13 and the predicate D1.y=33 in query block Q14. In order to satisfy the $3^{rd}$ condition of invariance, the filter predicate on D5 is not included in the definition of MV5. The above join set operation also uses SQL statement SELECT F.n, F.y, D1.m, D1.h, D5.z, D1.y, D5.g, F.x, MIN(F.m2), SUM(F.m1) to merge projected columns in query blocks Q13 and Q14.

Union

A union of two join sets A and B is another join set that contains all join predicates that are present in both join sets A and B. The notation U is used for a union. $A \cup B$ denotes that the union contains all elements of sets A and B.

In one embodiment, a union join set operation may be applied when a first join set intersects with a second join set, their intersection is not empty, and the tables in the intersection join invariantly with the other tables of the two constituent join sets. (The other table belongs either of the two join sets but is not in the intersection.) The resultant join set is not equivalent with either of the constituent join sets.

More specifically, the union join set operation may be applied to generate a resultant join sent and a resultant query block set associated with the resultant join set when the first constituent join set includes at least one table not involved in the second constituent join set; the second constituent join set includes at least one table not involved in the first constituent join set; and the first constituent join set and the second constituent join set contain at least one table in common, and the tables in the intersection have invariant joins with tables that are not in the intersection. The resultant join set includes all join edges involved in the first and the second constituent join sets; and the resultant query block set is a union of the query block sets associated with the first and the second constituent join sets.

Provided below is an example of a union join set operation that generates a resultant join set representing an MV.
Q15:
SELECT F.n, D1.m, SUM(F.m1)
FROM F, D1
WHERE F.fk1=D1.pk and F.x=6 and D1.z=25
GROUP BY F.n, D1.m;
[{F, D1}, {Q15}]
Q16:
SELECT F.y, D2.w, MAX(F.m2)
FROM F, D2
WHERE F.fk2=D2.pk and F.x=12 and D2.g>7
GROUP BY F.y, D2.w;
[{F, D2}, {Q16}]
[{F, D1, D2}, {Q15, Q16}]
Create materialized view MV6 . . . AS
SELECT F.n, F.y, D1.m, D2.w, D1.z, D2.g, F.x, MAX (F.m2), SUM(F.m1) FROM F, D1, D2
WHERE F.fk1=D1.pk and F.fk2=D2.pk and F.x IN (6, 12)
GROUP BY F.n, F.y, F.x, D1.m, D2.w, D1.z, D2.g;

In the above example, join set {F, D1} is associated with query block set {Q15} and has a join graph involving tables F and D1 and their join edges. Similarly, join set {F, D2} is associated with query block set {Q16} and has a join graph involving tables F and D2 and their join edges. In query block Q15, F.fk1 is a non-null foreign key that references primary key D1.pk. In query block Q16, F.fk2 is a non-null foreign key that references primary key D2.pk. F is invariant with respect to its join with D1 and D2. This may be denoted as Invariant ({F, D1}, D2) and Invariant ({F, D2}, D1).

MV6 is formed by unification of filter predicates and merging of select and group-by lists, which enables MV6 to be used to rewrite both query blocks Q15 and Q16. In the above example, the predicate F.x IN (6, 12) in MV6 unifies the predicate F.x=6 in query block Q15 and the predicate F.x=12 in query block Q16. In order to satisfy the $3^{rd}$ condition of invariance, the filter predicate on D1 and D2 are not included in the definition of MV6. The above join set operation also uses statement SELECT F.n, F.y, D1.m, D2.w, D1.z, D2.g, F.x, MAX(F.m2), SUM(F.m1) FROM F, D1, D2 to merge projected columns in query blocks Q15 and Q16.

Automatic Generation of Materialized View

Figure 4:
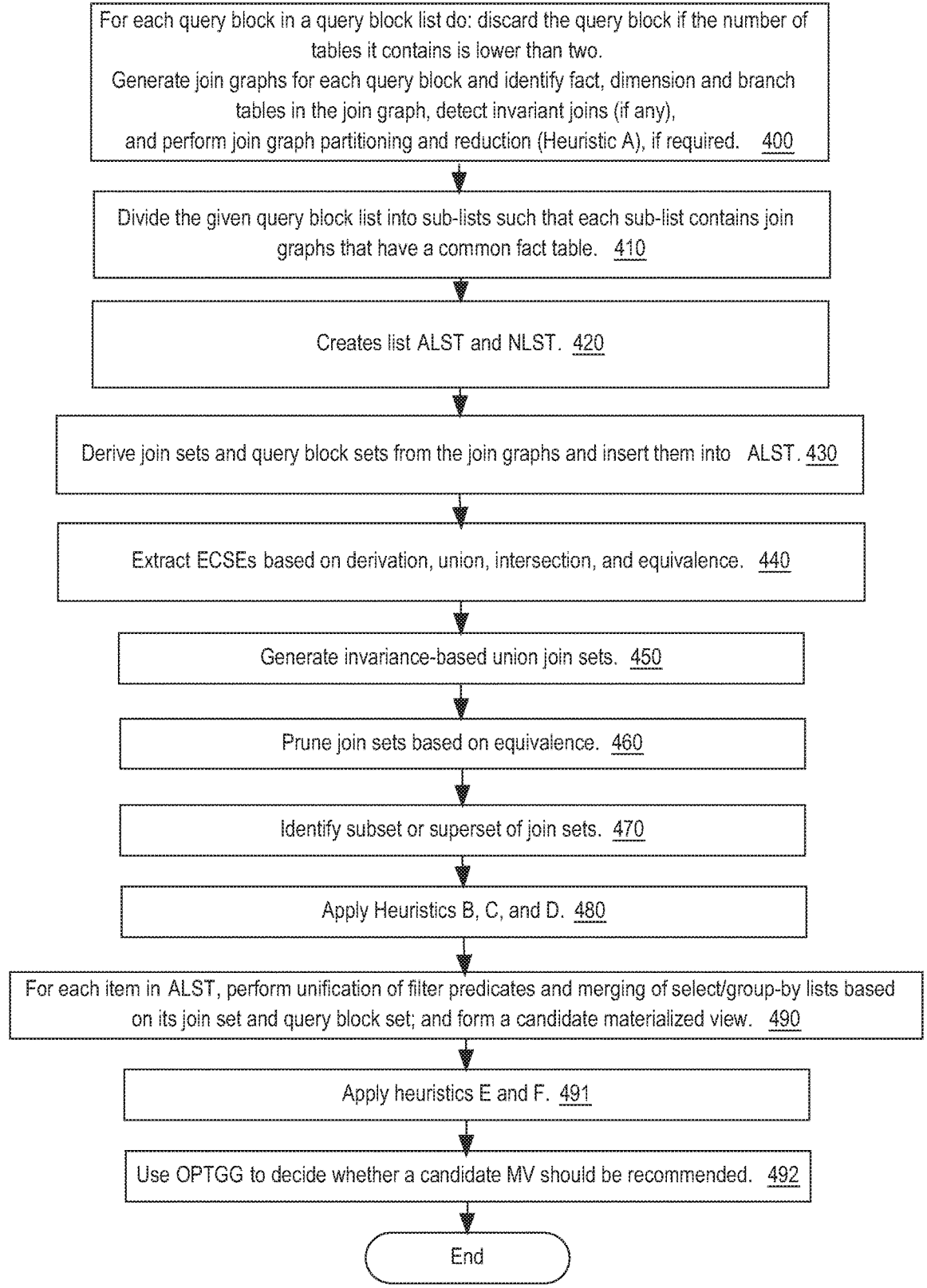
FIG. 4 is a flow chart depicting a procedure for automatic generation of materialized views from a query block list using extended covering join-subexpression technique.

FIG. 4 is a flow chart depicting a procedure for automatic generation of materialized views from a query block list using ECSE. FIG. 4C and FIG. 4D together provide an example of the ECSE algorithm.

Referring to FIG. 4, at operation 400, a query block is pruned from the query block list if the number of tables the query block contains is lower than two. A join graph for each query block in the query block list is generated. Fact, dimension and branch tables in each join graph are identified and invariant joins are detected.

Figure 5A:
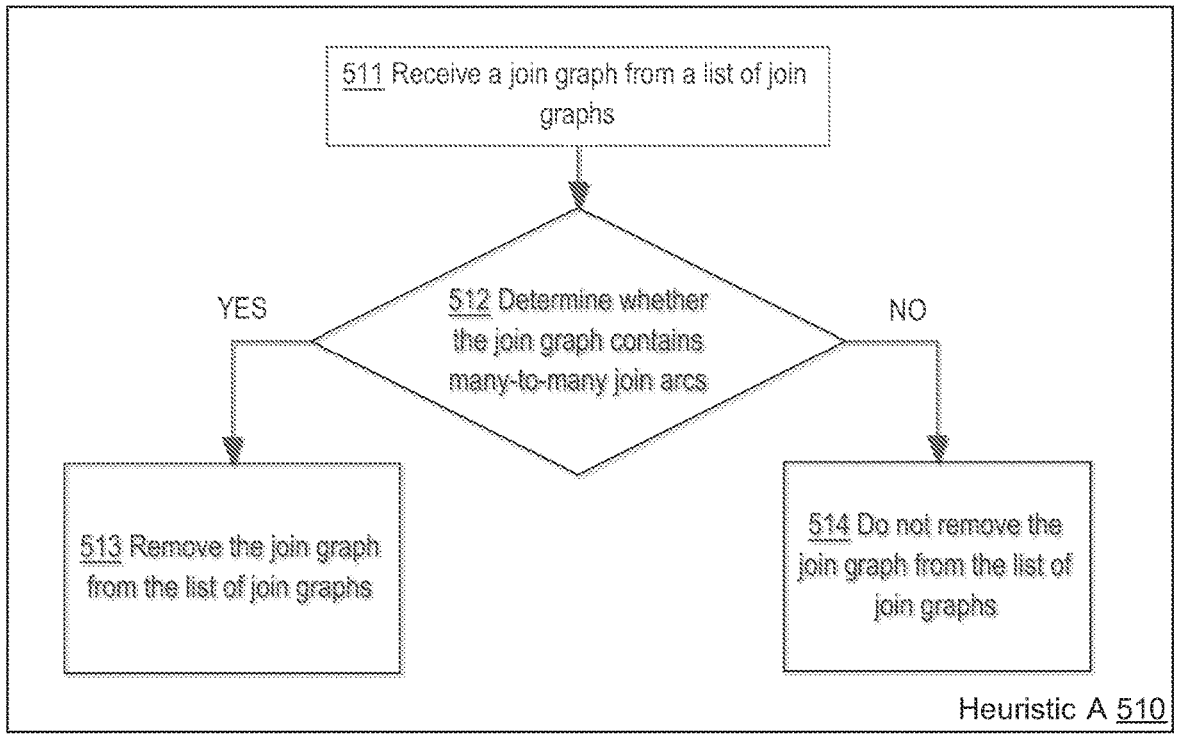
FIG. 5A illustrates an example flow diagram for performing Heuristic A.

In one embodiment, join graph partitioning and reduction, referred to herein as Heuristic A, are performed at operation 400 if a join graph has many-to-may join arcs. FIG. 5A illustrates an example flow diagram for performing Heuristic A 510. Referring to FIG. 5A, the system receives a join graph from a list of join graphs at operation 511. The system determines whether the join graph contains many-to-many join arcs at operation 512. A join graph contains many-to-many join arcs when multiple records in a fact table are associated with multiple records in another fact table. If the join graph contains many-to-many join arcs, then the system may remove the dimension table node involved in many-to-many join arc from the join graph. If the join graph does not contain many-to-many join arcs, then at operation 514 the join graph is not removed.

Referring to FIG. 4, a given query block list is divided into sub-lists such that each sub-list contains join graphs that have a common fact table at operation 410.

Referring to FIG. 4, list ALST and NLST are created at operation 420. ALST stores join sets and associated query block sets derived from the join graphs generated at operation 400. NLST stores resultant join sets and associated query block sets result from join set operations.

Referring to FIG. 4, join sets and query block sets are derived from the join graphs and are inserted into ALST at operation 430.

Operation 440 through 470 identify materialized views from a query block list includes join set operations that applied to constituent join sets to either form a resultant join set or update at least one constituent join set.

Join set operations are described with pseudocode. In the pseudocode, X, an item in the sub-list, refers to a join set and its associated query block set in a sub-list, and Y refers to another join set and its associated query block set in the same sub-list. Here, pair-wise comparisons take place between every item of the sub-list with every other item of the same sub-list. Self-comparison is avoided by making sure Xis not equal (i.e., < >) to Y. Each join set operation compares one join set and its associated query block set to another join set and the corresponding associated query block set in the sub-list. The join set operations either update a join set and its associated query block set or generate a new item, Z, comprising, a resultant join set and the corresponding associated query block set, where the resultant join set can be used to rewrite each query block in its query block set.

Operation 440 uses extended covering sub-expression (ECSE) technique to generates new resultant join sets. For example, multiple different queries in the working set may have the same join graph and hence are "covered" by the same join sub-expression. Resultant join sets are then used to form a candidate set of MVs.

Figure 4A:
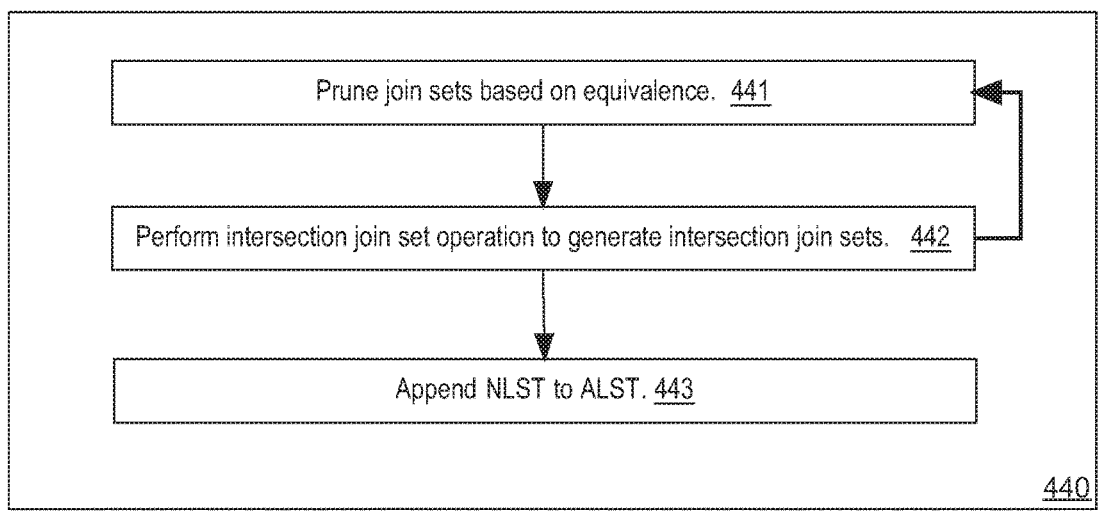
FIG. 4A is a flow chart depicting a procedure for automatic generation of materialized views from a query block list using covering join-subexpression technique.

FIG. 4A is a flow chart depicting a procedure for automatic generation of materialized views from a query block list using the EC SE algorithm. Referring to FIG. 4A, operations 441 through 442 are performed iteratively as a loop to extract CSE. Each iteration of the look may yield new join sets, change in the state of join sets, or removal of join sets. Updated join sets and associated query block sets result from join set operations are stored in ALST. New join sets and associated query block sets result from join set operations are stored in NLST. After operation 441 through 442 are performed, append NLST to ALST.

Referring to FIG. 4A, equivalence join set operation is performed to prune join sets and query block sets at operation 441. For two different items X and Y stored in ALST, if the join sets of item X and Y are the same, equivalence set operation is performed to remove item Y from ALST. The remaining join set X.jnset can be used to rewrite both query blocks X.qbset and Y.qbset. Provided below is a pseudocode description of operation 441. Here '< >' denotes a 'not equal to' comparison operator.

```
If (X < > Y ∧ X.jnset = Y.jnset)
{
    X.qbset = X.qbset ∪ Y.qbset;
    Remove Y from ALST;
}
```

In the above pseudocode description, X.qbset is the associated query block set for join set X.jnset. Y.qbset is the associated query block set for join set Y.jnset. In notation, the relationship between join set X.jnset and its associated query block set X.qbset can be written as [{X.jnset}, {X.qbset}]. Similarly, the relationship between join set Y.jnset and its associated query block set Y.qbset can be written as [{Y.jnset}, {Y.qbset}].

When the join set derived from the join graphs of two query blocks are the same, equivalence join set operation is performed to prune the join set and query block set derived from one of the two query blocks. The new relationship between the remaining join set X.jnest and its associated query block set could be written as [{X.jnset}, {X.qbset ∪ Y.qbset}], which means join set X.jnset can now be used to rewrite both query block sets, X.qbset and Y.qbset, derived from the two query blocks.

Referring to FIG. 4A, intersection set operation is performed to identify intersection join sets at operation 442. For two different items X and Y stored in ALST, if the join set of item X is not a subset of the join set of item Y, the join set of item Y is not a subset of the join set of item X, and there is an overlap between the join set of item X and the join set of item Y, generate a new join set which represents the overlapped section of the two join sets. The new join set is added to NLST. Provided below is a pseudocode description of operation 442.

```
Else if (X < > Y ∧ Y.jnset ⊄ X.jnset ∧ X.jnset ⊄ Y.jnset ∧ | X.jnset ∩ Y.jnset | ≥ 1)
{
    Z.jnset = X.jnset ∩ Y.jnset;
    Z.qbset = X.qbset ∪ Y.qbset;
    Insert Z into NLST;
}
```

In the above pseudocode description, the intersection join set operation is performed to generate a new join set Z.jnset. For two different items X and Y stored in ALST, if join set of item X (X.jnset) is not a subset of t the join set of item Y (Y.jnset), the join set of item Y (Y.jnset) is not a subset of the join set of item X (X.jnset), and there is an overlap between Y.jnset and X.jnset (e.g. contains at least one table), intersection join set operation is performed to generate new join set Z.jnset. Z.jnset contains the common part of join sets Y.jnset and X.jnset, and could be used to rewrite both query block sets X.qbset and Y.quset. The relationship between the new join set Z.jnset and its associated query block set could be written as [{Z.jnest}, {X.qbset ∪ Y.qbset}].

Referring to FIG. 4A, after operation 441 through 442 are performed, append NLST to ALST at operation 443.

Referring to FIG. 4, invariance-based union join sets are identified at operation 450. For two different items X and Y stored in ALST, if the join set of item Y is not a subset of the join set of item X, the join set of item X is not a subset of the join set item Y, and there is an overlap between the join set of item X and the join set of item Y, and there is invariant join present in both the join sets, then perform union join set operation to generate a new join set that represents the union of the join set of item X and the join set of item Y, and the new join set can be used to rewrite both query block set of items X and Y. The new join set is added to ALST. Provided below is a pseudocode description of operation 450.

```
If (X < > Y ∧ Y.jnset ⊄ X.jnset ∧ X.jnset ⊄ Y.jnset ∧ X.jnset ∩ Y.jnset ≠ ∅ ∧ ∀ T ∈ ((X.jnset ∪ Y.jnset) − (X.jnset ∩ Y.jnset)), Invariant(X.jnset ∩ Y.jnset, T))
{
    Z.jnset = X.jnset ∪ Y.jnset;
    Z.qbset = X.qbset ∪ Y.qbset;
    Insert Z into ALST;
}
```

In the above pseudocode description, the union join set operation is performed to generate new join set Z.jnset. For two different items X and Y stored in ALST, if the join set of item Y (Y.jnset) is not a subset of the join set of item X (X.jnset), the join set of item X (X.jnset) is not a subset of the join set of item Y (Y.jnset), there is an overlap between Y.jnset and X.jnset, and there is invariant join presented, union join set operation is performed to generate new join set Z.jnset. Z.jnset contains the union join set of Y.jnset and X.jnset, and could be used to rewrite both query blocks sets X.qbset and Y.qbset. The relationship between the new join set Z.jnset and its associated query block set could be written as [{Z.jnest}, {X.qbset ∪ Y.qbset}. The new join set Z.jnset is added to ALST.

Referring to FIG. 4, the equivalence join set operation is performed to prune join sets and query block sets at operation 460.

Figure 4B:
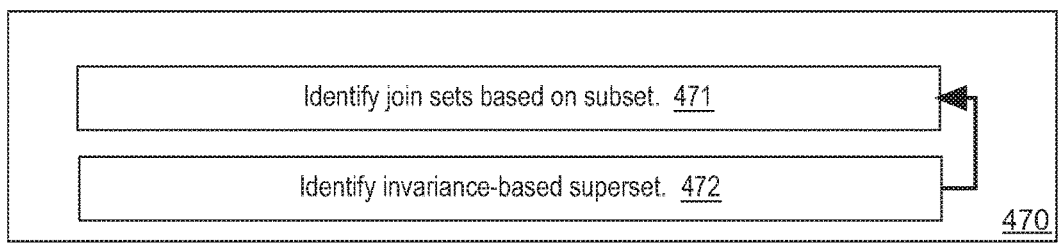
FIG. 4B is a flow chart depicting a procedure for generation of subset or superset of join sets.

FIG. 4B is a flow chart depicting a procedure for operation 470. Referring to FIG. 4B, operation 471 through 472 are performed iteratively as a loop to identify subset or superset of join sets. Each iteration of the look may change in the state of join sets. Updated join sets and associated query block sets result from join set operations are stored in ALST.

Referring to FIG. 4B, subset join set operation is performed to identify subset join sets at operation 471. For two different items X and Y stored in ALST, if the join set of item X is a subset of the join set of item Y, update the query block set of item X to contain both query block set of item X and query block set of item Y. Provided below is a pseudocode description of operation 471.

If (X.jnset ⊂ Y.jnset)
    X.qbset=X.qbset ∪ Y.qbset;

In the above pseudocode description, the query block set derived from the join graph of query block X (X.qbset) is updated to contain both query block set of item X and query block set of item Y when the join set of item X (X.jnset) is a subset of the join set of item Y (Y.jnset). The new relationship between join set X.jnset and its associated query block set could be written as [{X.jnest}, {X.qbset ∪ Y.qbset}], which means join set X.jnset now can be used to rewrite both query block sets X.qbset and Y.qbset.

Referring to FIG. 4B, superset join set operation is performed to identify superset join sets at operation 472, If the join set of item Y in ALST is a subset of the join set of item X in the same list and invariant join is presented, update the query block set of item X to contain both query block set of item X and query block set of item Y. Provided below is a pseudocode description of operation 472.

Else if (Y.jnset ⊂ X.jnset ∧ ∀ T ∈ (X.jnset−Y.jnset), Invariant(Y.jnset, T))
X.qbset=X.qbset ∪ Y.qbset;

In the above pseudocode description, the query block set of item X (X.qbset) is updated to contain both query block set of item X (X.qbset) and query block set of item Y (Y.qbset) when the join set of item Y (Y.jnset) is a subset of the join set of item X (X.jnset) and there is an invariant join presented. The new relationship between join set X.jnset and its associated query block set could be written as [{X.jnest}, {X.qbset U Y.qbset}], which means join set X.jnset now can be used to rewrite both query block sets X.qbset and Y.qbset.

Referring to FIG. 4, join sets and associated query block set reduction are performed at operation 480, referred to herein as Heuristics B, C, and D.

Figure 5B:
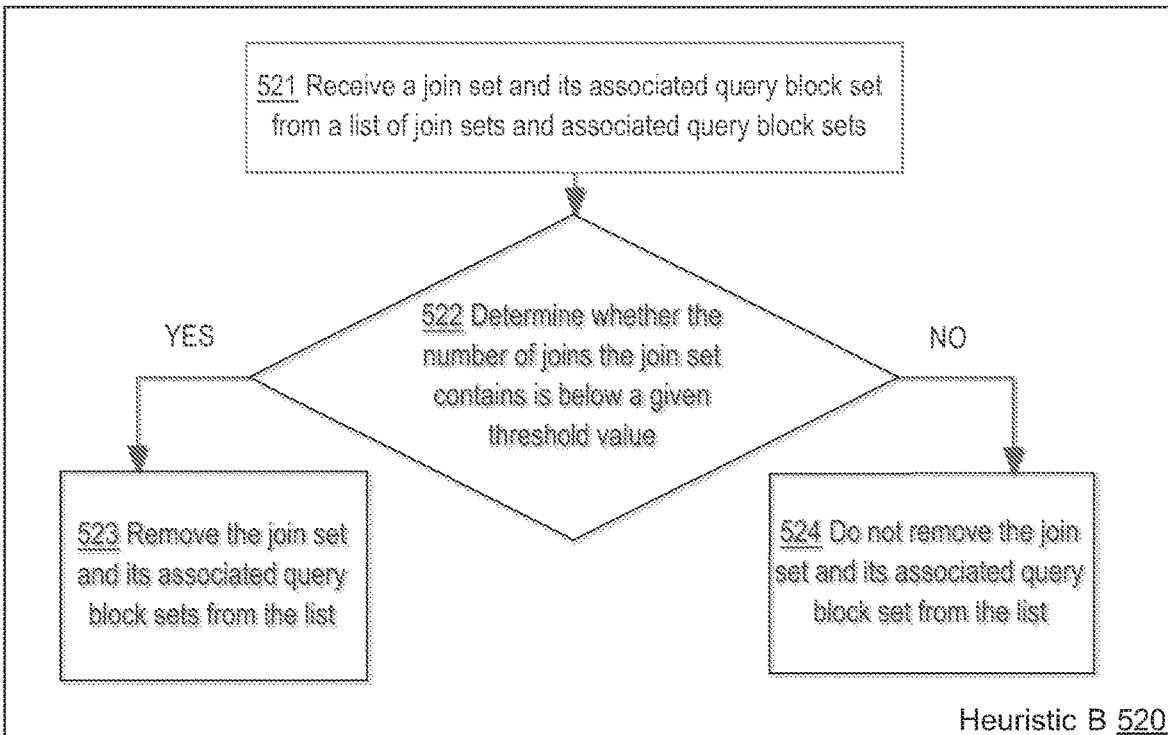
FIG. 5B illustrates an example flow diagram for performing Heuristic B.

In one embodiment, join set partitioning and reduction, referred to herein as Heuristic B, are performed if the number of joins a join set contains is below a given threshold value. FIG. 5B illustrates an example flow diagram for performing Heuristic B 520. Referring to FIG. 5B, the system receives a join set and its associated query block set from a list of join sets and associated query block sets at operation 521. The system determines whether the number of joins the join set contains is below a given threshold value at operation 522. For example, a given threshold value, Ψ, can be computed as half of the average number of joins in all query blocks in all queries of a given workload. If the number of joins the join set contains is below a given threshold value, then the system removes the join set and its associated query block set from the list of join sets and associated query block sets at operation 523. If the number of joins the join set contains is not below the given threshold value, then at operation 524 the join set and its associated query block set are not removed.

Provided below is a pseudocode description of Heuristic B.

```
If (| X.jnset | < Ψ)
{
        Remove X from ALST;
        Continue;
}
```

In the above pseudocode description, join set X.jnest and its associated query block set X.qbset is pruned from ALST if the number of joins X.jnest contains is below a given threshold value, Ψ.

Figure 5C:
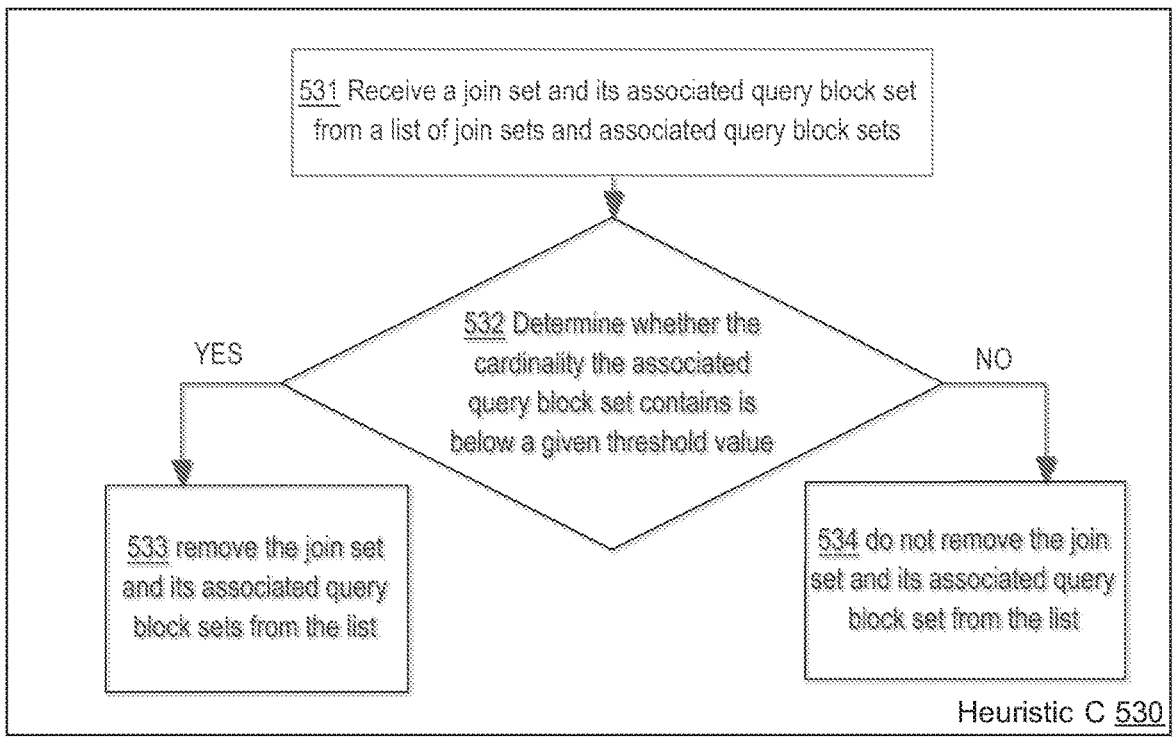
FIG. 5C illustrates an example flow diagram for performing Heuristic C.

In one embodiment, join set partitioning and reduction, referred to herein as Heuristic C, are performed if the number of elements of a join set's associated query block set is below a given threshold value. FIG. 5C illustrates an example flow diagram for performing Heuristic C 530. Referring to FIG. 5C, the system receives a join set and its associated query block set from a list of join sets and associated query block sets at operation 531. The system determines whether the number of elements the associated query block contains is below a given threshold value at operation 532. For example, a given threshold value, β, can be set to 2, which ensures that only those MVs that can rewrite at least 2 query blocks are recommended. If the number of elements the associated query block contains is below a given threshold value, then the system removes the join set and its associated query block set from the list of join sets and associated query block sets at operation 533. If the number of elements the associated query block contains is not below the given threshold value, then at operation 534 the join set and its associated query block set are not removed.

Provided below is a pseudocode description of Heuristic C.

```
If (| X.qbset | < β)
{
        Remove X from ALST;
        Continue;
}
```

In the above pseudocode description, join set X.jnest and its associated query block set X.qbset is pruned from ALST if the number of elements of X.qbset is below a given threshold value, β (e.g., 2).

Figure 5D:
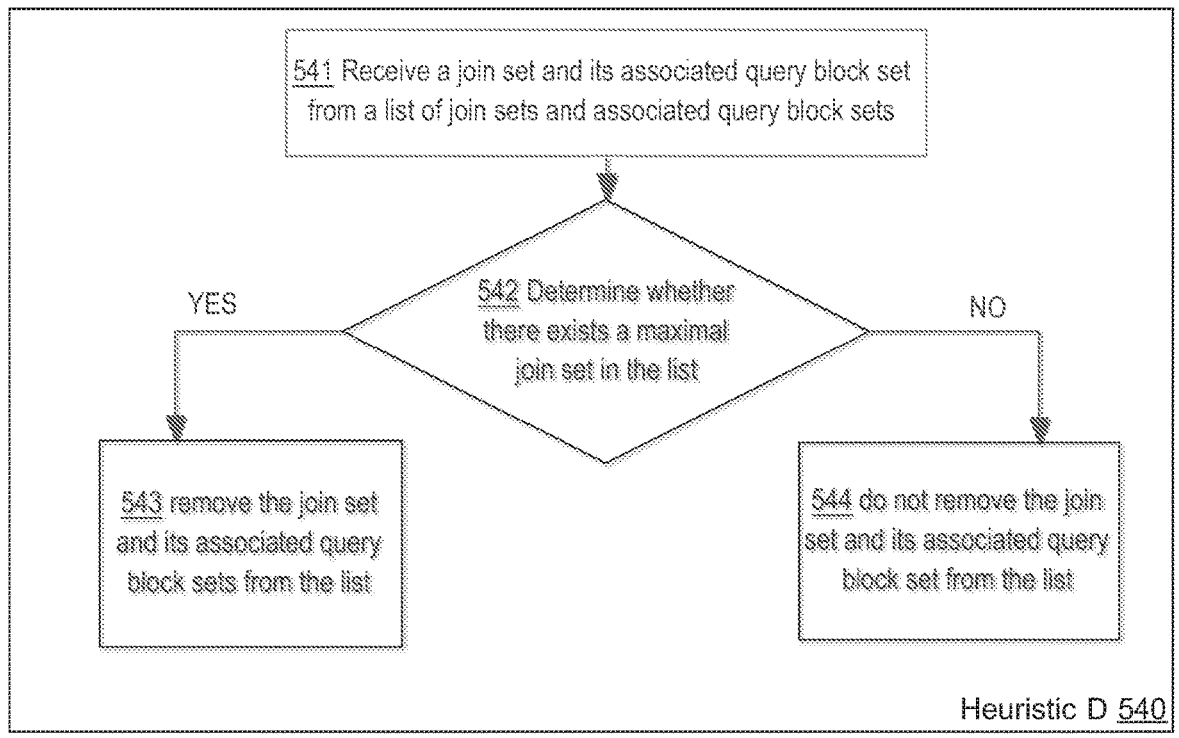
FIG. 5D illustrates an example flow diagram for performing Heuristic D.

In one embodiment, join set partitioning and reduction, referred to herein as Heuristic D, are performed if there exists a maximal join set. FIG. 5D illustrates an example flow diagram for performing Heuristic D 540. Referring to FIG. 5D, the system receives a join set and its associated query block set from a list of join sets and associated query block sets at operation 541. The system determines whether there exists a maximal join set in the list of join sets at operation 542. For example, join set $J_i$ is considered maximal in relation to join set $J_k$ if join set $J_k$ is a subset of join set $J_i$, and $J_k$'s associated query block set is a subset of $J_i$'s associated query block set. If there exists a maximal join set in the list of join sets, then the system removes the join set and its associated query block set from the list of join sets and associated query block sets at operation 543. If there does not exist a maximal join set in the list of join sets, then at operation 544 the join set and its associated query block set are not removed.

Provided below is a pseudocode description of Heuristic D.

If (X.jnset ⊆ Y.jnset ∧ X.qbset ⊆ Y.qbset)
Remove X from ALST

Referring to FIG. 4, perform unification of filter predicates and merging of select or group-by lists based on its join set and query block set for each item in ALST, and form a candidate materialized view at operation 490.

Referring to FIG. 4, join sets and associated query block set reduction are performed at operation 480, referred to herein as Heuristics E and F.

Figure 5E:
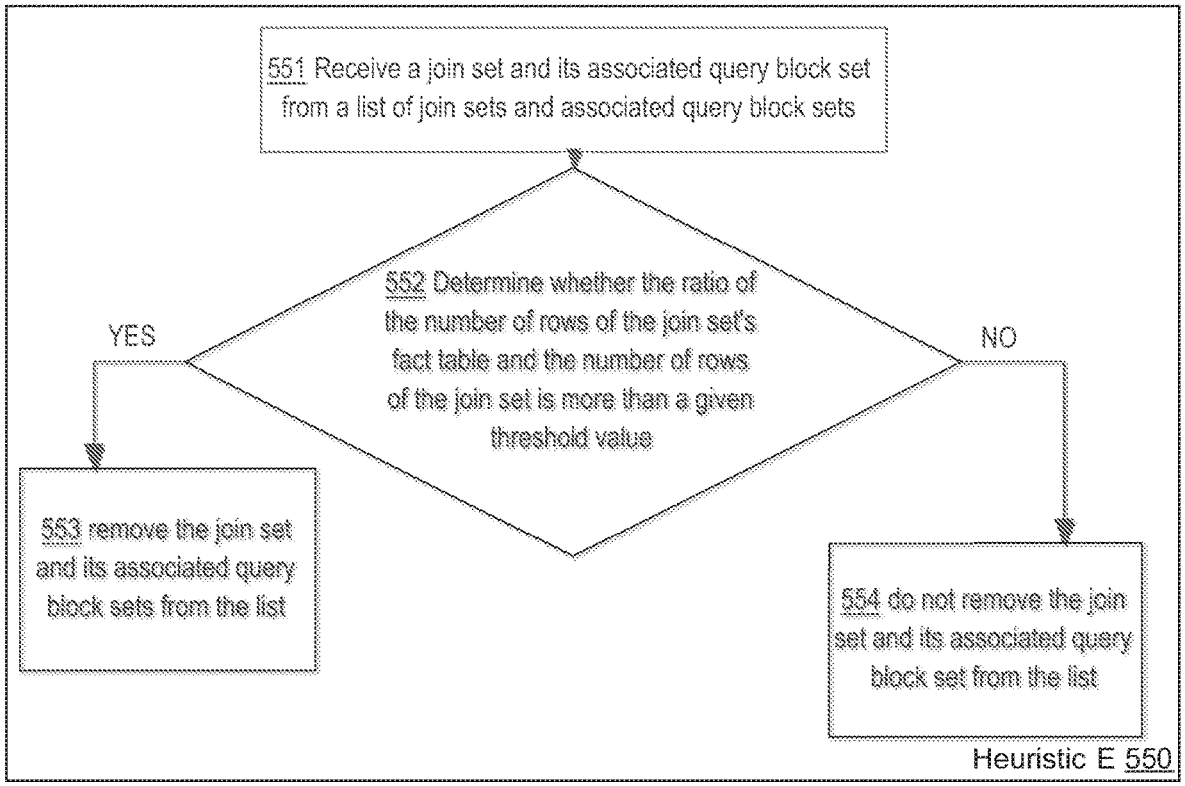
FIG. 5E illustrates an example flow diagram for performing Heuristic E.

In one embodiment, join set partitioning and reduction, referred to herein as Heuristic E, is performed if the ratio of the number of rows of the join set's fact table and the number of rows is more than a give n threshold value. FIG. 5E illustrates an example flow diagram for performing Heuristic E 550. Referring to FIG. 5E, the system receives a join set and its associated query block set from a list of join sets and associated query block sets at operation 551. The system determines whether the ratio of the number of rows of the join set's fact table and the number of rows is more than a given threshold value at operation 552. In one example, the estimation of join set's number of rows takes into account join predicates, unified filer predicates, and grouping columns. If the ratio of the number of rows of the join set's fact table and the number of rows is more than a given threshold value, then the system removes the join set and its associated query block set from the list of join sets and associated query block sets at operation 553. If the ratio of the number of rows of the join set's fact table and the number of rows is no more than the given threshold value, then at operation 554 the join set and its associated query block set are not removed.

Figure 5F:
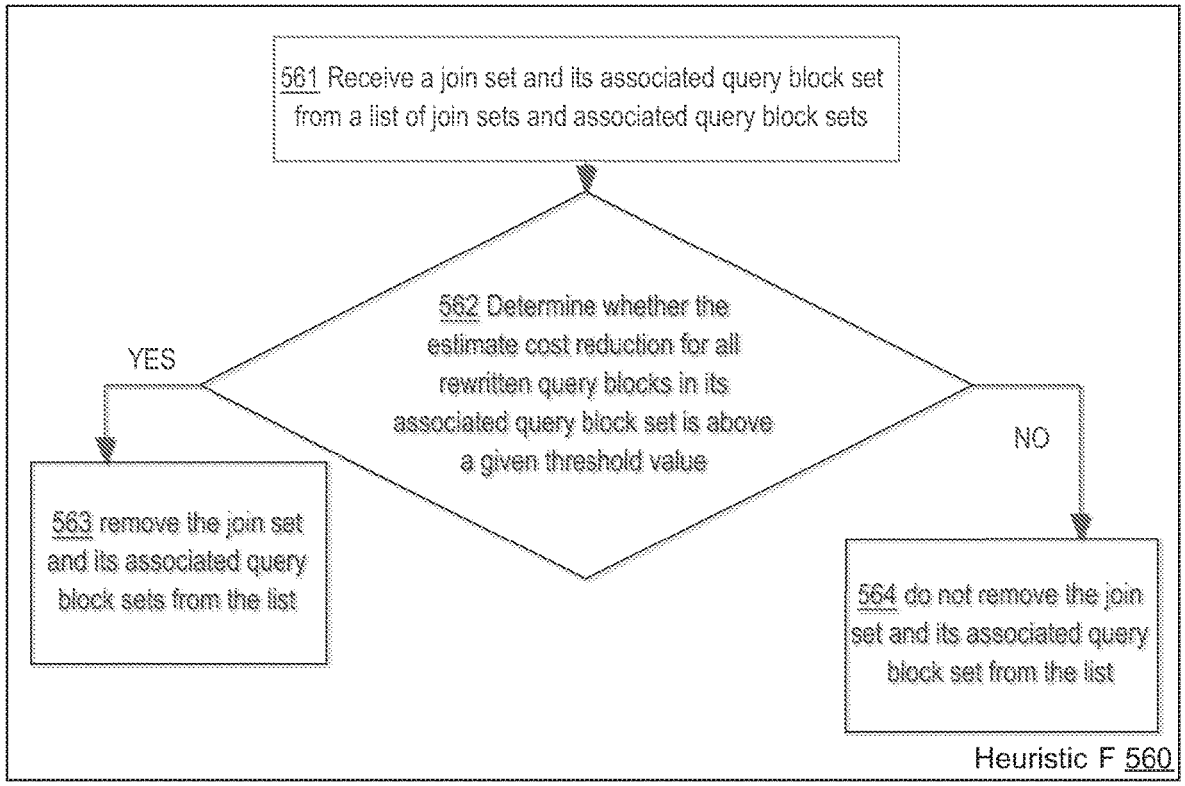
FIG. 5F illustrates an example flow diagram for performing Heuristic F.

In another embodiment, join set partitioning and reduction, referred to herein as Heuristic F, are performed if the estimated cost reduction for all rewritten query blocks in its associated query block set is above a given threshold value. FIG. 5F illustrates an example flow diagram for performing Heuristic F 560. Referring to FIG. 5F, the system receives a join set and its associated query block set from a list of join sets and associated query block sets at operation 561. The system determines whether the estimated cost reduction for all rewritten query blocks in its associated query block set is above a given threshold value at operation 562. For example, a join set's associated query block set{Q1, Q2, Q3} will be pruned, if [Cost(RW(Q1))+Cost(RW(Q2))+Cost(RW(Q3))]/[Cost(Q1)+(Cost(Q2)+Cost(Q3)]>$\Omega$. If the estimated cost reduction for all rewritten query blocks in its associated query block set is above a given threshold value, then the system removes the join set and its associated query block set from the list of join sets and associated query block sets at operation 563. If the estimated cost reduction for all rewritten query blocks in its associated query block set is not above the given threshold value, then at operation 564 the join set and its associated query block set are not removed.

Each resultant join set and associated query block sets can be used to generate a candidate MV. Referring to FIG. 4, an optimal global greedy (OPTGG) algorithm can decide whether to recommend a candidate MV based on net benefit to the workload performance at operation 492. OPTGG takes into consideration constraints such as storage space, MV maintenance cost, etc.

Figure 6:
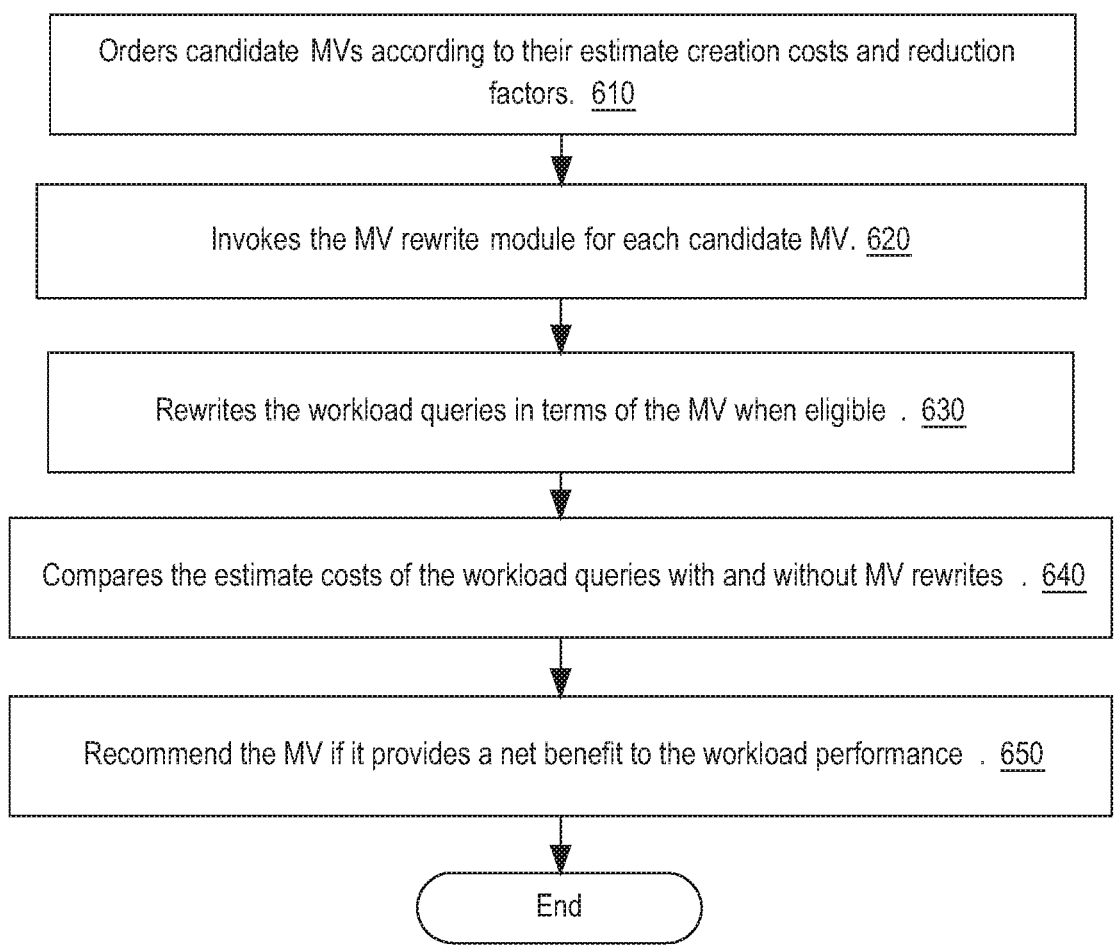
FIG. 6 is a flow chart depicting a procedure for the optimal global greedy algorithm.

FIG. 6 is a flow chart depicting a procedure for the OPTGG algorithm. Referring to FIG. 6, the OPTGG algorithm first orders the candidate MVs generated from resultant join sets according to their estimated creation costs and reduction factors at step 610. At step 620, the OPTGG algorithm then invokes the MV rewrite module for each candidate MV. At step 630, the OPPTGG algorithm rewrites the workload queries in terms of the MV when eligible. At step 640, the OPPTGG algorithm then compares the estimated costs of the workload queries with and without MV rewrite. At step 650, the MV is recommended if it provides a net benefit to the workload performance.

Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
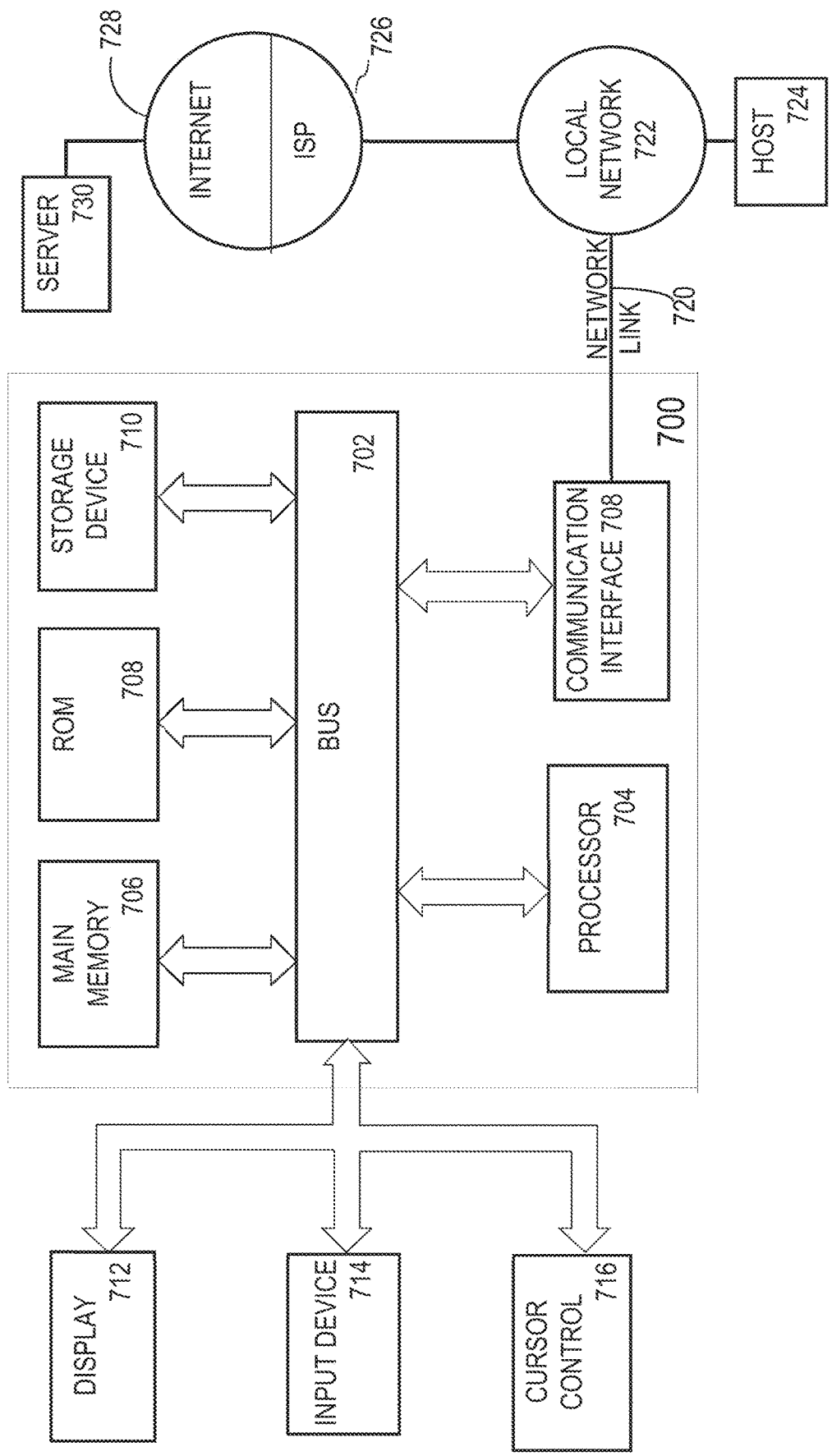
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

In some embodiments, co-processors may reside on the same chip as hardware processors or processor cores. Examples of such co-processors include a data analytics accelerator (DAX) co-processor and a single instruction, multiple data (SIMD) processor.

A DAX co-processor enables database operations to run directly in the co-processor while hardware processor cores execute other instructions. Such operations include (1) scanning an array for elements which match (or greater than or less than) an input value and returning a bit vector with bits set for matches; (2) selecting elements from an array based on a bit vector; and (3) in set operation, given an input set of integers, determining how many of them are also present in another set.

SIMD processors perform the same operation on multiple data items simultaneously. SIMD processors exploit data level parallelism by executing a single instruction against data in multiple registers or subregisters. Thus, the throughput per instruction may be increased accordingly.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to an embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
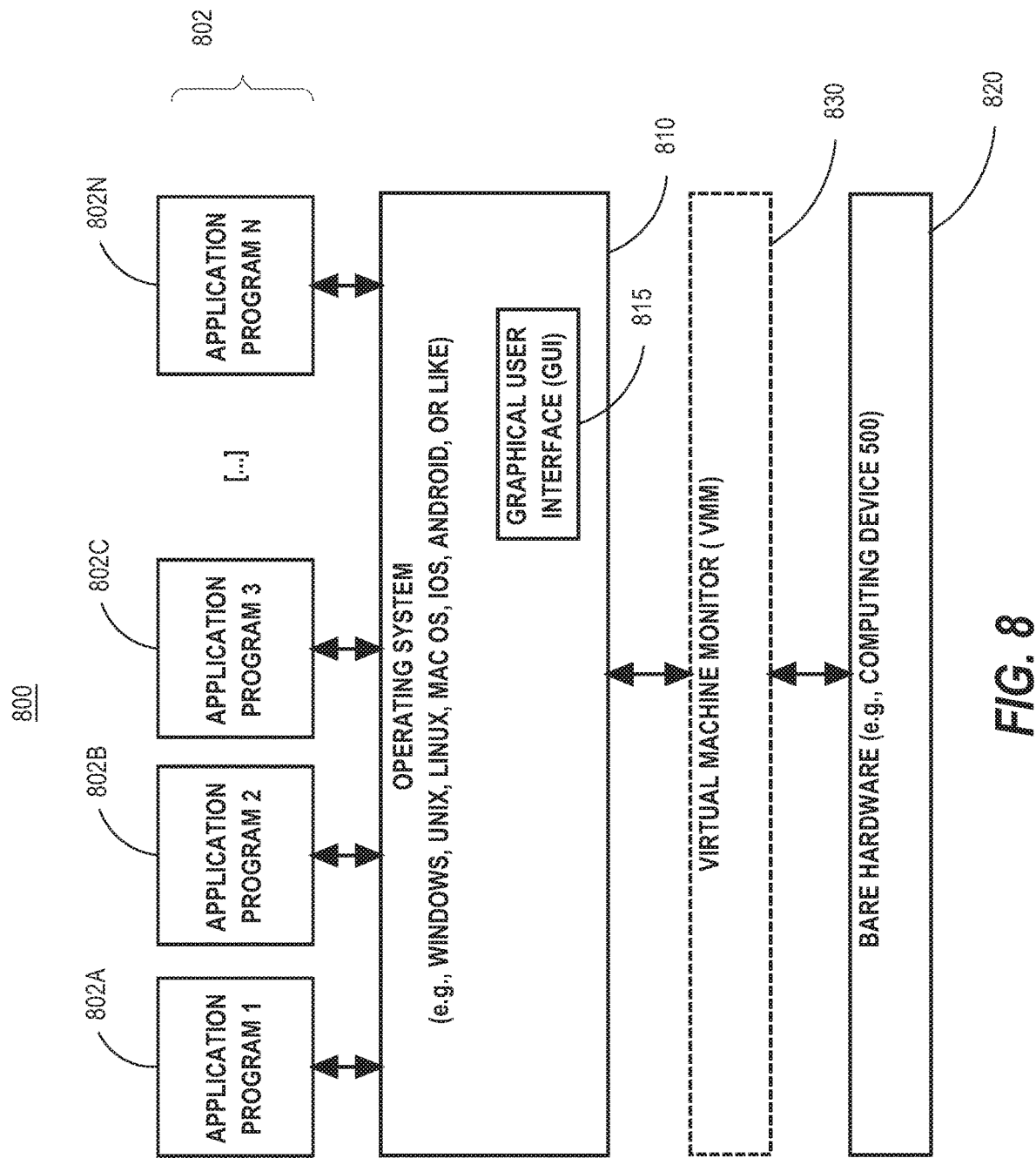
FIG. 8 is a block diagram of a software system 800 that may be employed for controlling the operation of computer system 700.

FIG. 8 is a block diagram of a software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 700. The applications or other software intended for use on system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 910 can execute directly on the bare hardware 820 (e.g., processor(s) 704) of system 800. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of system 700 directly. In these instances, the same version of the guest operating system configured to execute on the bare hardware 820 directly may also execute on VMI 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
    deriving a plurality of join sets from a query workload set, wherein each join set of said plurality of join sets represents a respective join graph for a respective query block set from said query workload set, said respective join graph including one or more join edges that each comprise one or more join conditions;
    wherein constituent join sets of said plurality of join sets and respective query block sets of said constituent join sets include a first join set and a first query block set associated with said first join set, and a second join set and a second query block set associated with said second join set, wherein said first join set represents a first join graph, wherein said second join set represents a second join graph, wherein the first join graph involves a table not involved in the second join graph or the second join graph involves a table not involved in the first join graph;
    applying a join set operation to the constituent join sets and respective query block sets to generate a resultant join set associated with a resultant query block set that includes each query block set of each of said constituent join sets;
    based on the resultant join set associated with respective resultant query block set, determining that a materialized view based on said resultant query block set provides a net work load benefit to a set of queries;
    in response to determining that the materialized view provides a net work load benefit to a set of queries, selecting the materialized view for creation.

2. The method of claim 1, wherein applying the join set operation includes applying an intersection join set operation to generate a resultant join set and a resultant query block set associated with said resultant join set by at least determining that said first join set intersects with said second join set, wherein:
    the first join set includes at least a first table not involved in the second join set;
    the second join set includes at least a second table not involved in the first join set;
    the first join set and the second join set both contain a plurality of tables that does not include said first table and said second table;

the resultant join set contains a plurality of tables common to both the first join set and the second join set not including said first table and said second table;

the resultant query block set includes said first query block set and said second query block set.

3. The method of claim 1, wherein applying the join set operation includes applying an subset join set operation to generate a resultant join set and a resultant query block set associated with said resultant join set by at least determining that said first join set is a subset of said second join set, wherein:

the second join set includes all tables involved in the first join set;

the second join set includes at least one table not involved in the first join set;

the resultant join set includes said all tables involved in the first join set;

the resultant query block set includes said first query block set and said second query block set.

4. The method of claim 1, wherein applying the join set operation includes applying an superset join set operation to generate a resultant join set and a resultant query block set associated with said resultant join set by at least determining that the said first join set is a superset of the said second join set and is in invariant with respect to said second join set, wherein:

the first join set includes all tables involved in the second join set;

the first join set includes at least one table not involved in the second join set;

the resultant join set includes all tables involved in the respective join graph of the first join set;

the resultant query block set includes said first query block set and said second query block set.

5. The method of claim 1, wherein applying the join set operation includes applying an union join set operation to generate a resultant join set and a resultant query block set associated with said resultant join set by at least determining that said first join set intersects with the said second join set and that a respective intersection of said first join set and said second join set is invariant with respect to said first join set and said second join set, wherein:

the first join set includes at least one table not involved in the second join set;

the second join set includes at least one table not involved in the first join set;

the first join set and the second join set contain at least one table in common;

the resultant join set includes all tables involved in the first join set;

the resultant join set includes all tables involved in the second join set;

the resultant query block set includes said first query block set and said second query block set.

6. The method of claim 1, further including:

determining that a particular join set from said plurality of join sets involves a many-to-many join between a pair of fact tables;

in response to said determining, forgoing applying a join set operation to said particular join set.

7. The method of claim 1, the method further including:

applying join set operations to constituent join sets that include said plurality of join sets to form a pool of resultant join sets;

pruning one or more resultant join sets from said pool of resultant join sets;

after pruning one or more resultant join sets, determining for each particular resultant join set of at least some of said pool of resultant join sets that a materialized view based on each particular subset resultant join set provides a net workload benefit to a set of queries.

8. The method of claim 7, wherein pruning one or more resultant join sets includes:

making a determination that a certain join graph of a certain resultant join set from said pool involves less than a threshold number of joins; and in response to making said determination, pruning said certain resultant join set from said pool.

9. The method of claim 8, wherein pruning one or more resultant join sets includes:

making a determination that a corresponding query block set of a certain resultant join set from said pool involves less than a threshold number of query blocks; and in response to making said determination, pruning said certain resultant join set from said pool.

10. One or more non-transient computer readable media storing instructions that, when executed by one or more processors, cause:

deriving a plurality of join sets from a query workload set, wherein each join set of said plurality of join sets represents a respective join graph for a respective query block set from said query workload set, said respective join graph including one or more join edges that each comprise one or more join conditions;

wherein constituent join sets of said plurality of join sets and respective query block sets of said constituent join sets include a first join set and a first query block set associated with said first join set, and a second join set and a second query block set associated with said second join set, wherein said first join set represents a first join graph, wherein said second join set represents a second join graph, wherein the first join graph involves a table not involved in the second join graph or the second join graph involves a table not involved in the first join graph;

applying a join set operation to the constituent join sets and respective query block sets to generate a resultant join set associated with a resultant query block set that includes each query block set of each of said constituent join sets;

based on the resultant join set associated with respective resultant query block set, determining that a materialized view based on said resultant query block set provides a net work load benefit to a set of queries;

in response to determining that the materialized view provides a net work load benefit to a set of queries, selecting the materialized view for creation.

11. The one or more non-transient computer readable media of claim 10, wherein applying the join set operation includes applying an intersection join set operation to generate a resultant join set and a resultant query block set associated with said resultant join set by at least determining that said first join set intersects with said second join set, wherein:

the first join set includes at least a first table not involved in the second join set;

the second join set includes at least a second table not involved in the first join set;

the first join set and the second join set both contain a plurality of tables that does not include said first table and said second table;

the resultant join set contains a plurality of tables common to both the first join set and the second join set not including said first table and said second table;

the resultant query block set includes said first query block set and said second query block set.

12. The one or more non-transient computer readable media of claim 10, wherein applying the join set operation includes applying an subset join set operation to generate a resultant join set and a resultant query block set associated with said resultant join set by at least determining that said first join set is a subset of said second join set, wherein:

the second join set includes all tables involved in the first join set;

the second join set includes at least one table not involved in the first join set;

the resultant join set includes said all tables involved in the first join set;

the resultant query block set includes said first query block set and said second query block set.

13. The one or more non-transient computer readable media of claim 10, wherein applying the join set operation includes applying an superset join set operation to generate a resultant join set and a resultant query block set associated with said resultant join set by at least determining that the said first join set is a superset of the said second join set and is in invariant with respect to said second join set, wherein:

the first join set includes all tables involved in the second join set;

the first join set includes at least one table not involved in the second join set;

the resultant join set includes all tables involved in the respective join graph of the first join set;

the resultant query block set includes said first query block set and said second query block set.

14. The one or more non-transient computer readable media of claim 10, wherein applying the join set operation includes applying an union join set operation to generate a resultant join set and a resultant query block set associated with said resultant join set by at least determining that said first join set intersects with the said second join set and that a respective intersection of said first join set and said second join set is invariant with respect to said first join set and said second join set, wherein:

the first join set includes at least one table not involved in the second join set;

the second join set includes at least one table not involved in the first join set;

the first join set and the second join set contain at least one table in common;

the resultant join set includes all tables involved in the first join set;

the resultant join set includes all tables involved in the second join set;

the resultant query block set includes said first query block set and said second query block set.

15. The one or more non-transient computer readable media of claim 10, wherein the instructions that, when executed by one or more processors, cause:

determining that a particular join set from said plurality of join sets involves a many-to-many join between a pair of fact tables;

in response to said determining, forgoing applying a join set operation to said particular join set.

16. The one or more non-transient computer readable media of claim 10, wherein the instructions that, when executed by one or more processors, cause:

applying join set operations to constituent join sets that include said plurality of join sets to form a pool of resultant join sets;

pruning one or more resultant join sets from said pool of resultant join sets;

after pruning one or more resultant join sets, determining for each particular resultant join set of at least some of said pool of resultant join sets that a materialized view based on each particular subset resultant join set provides a net work load benefit to a set of queries.

17. The one or more non-transient computer readable media of claim 16, wherein pruning one or more resultant join sets includes:

making a determination that a certain join graph of a certain resultant join set from said pool involves less than a threshold number of joins; and in response to making said determination, pruning said certain resultant join set from said pool.

18. The one or more non-transient computer readable media of claim 16, wherein pruning one or more resultant join sets includes:

making a determination that a corresponding query block set of a certain resultant join set from said pool involves less than a threshold number of query blocks; and in response to making said determination, pruning said certain resultant join set from said pool.

* * * * *

UNITED STATES PATENT AND TRADEMARK OFFICE
CERTIFICATE OF CORRECTION

PATENT NO. : 11,615,107 B2
APPLICATION NO. : 16/523872
DATED : March 28, 2023
INVENTOR(S) : Ahmed et al.

It is certified that error appears in the above-identified patent and that said Letters Patent is hereby corrected as shown below:

In the Drawings

On sheet 11 of 13, in FIG. 6, under Reference Numeral 630, Line 1, delete "eligible ." and insert -- eligible. --, therefor.

On sheet 11 of 13, in FIG. 6, under Reference Numeral 640, Line 1, delete "rewrites ." and insert -- rewrites. --, therefor.

On sheet 11 of 13, in FIG. 6, under Reference Numeral 650, Line 1, delete "performance ." and insert -- performance. --, therefor.

On sheet 13 of 13, in FIG. 8, under Reference Numeral 830, Line 1, delete "( VMM)" and insert -- (VMM) --, therefor.

In the Specification

In Column 4, Line 30, delete "edges" and insert -- edges. --, therefor.

In Column 5, Line 31, delete "$\ltimes$" and insert -- $\bowtie$ --, therefor.

In Column 5, Line 47, delete "$\subseteq$is" and insert -- $\nsubseteq$ is --, therefor.

In Column 5, Line 48, delete "B $\subseteq$denotes" and insert -- B $\nsubseteq$ A denotes --, therefor.

In Column 5, Line 60, delete "A" and insert -- A. --, therefor.

In Column 7, Line 4, delete "#2 in [0058]." and insert -- #2. --, therefor.

In Column 8, Lines 48-52, delete "predicate F.x IN (4,6) in query block Q6 and the predicate F.x=11 in query block Q9. The above join set operation also uses statement SELECT F.n. F.y, D7.y, D7.h, Signed and Sealed this
Thirteenth Day of February, 2024

Katherine Kelly Vidal
*Director of the United States Patent and Trademark Office*

CERTIFICATE OF CORRECTION (continued)
U.S. Pat. No. 11,615,107 B2

D7.c, F.x, F.f2, F.f3, COUNT(F.m2), SUM(F.m1) to merge projected columns in query blocks Q9 and Q10." and insert the same on Column 8, Line 47 as a continuation of the same paragraph, therefor.

In Column 11, Line 48, delete "D2}" and insert -- D2) --, therefor.

In Column 12, Line 42, delete "Xis" and insert -- X is --, therefor.

In Column 12, Line 59, delete "EC SE" and insert -- ECSE --, therefor.

In Column 13, Line 39, delete "Xis" and insert -- X is --, therefor.

In Column 13, Line 58, delete "of t" and insert -- of --, therefor.

In Column 14, Line 6, delete "Xis" and insert -- X is --, therefor.

In Column 14, Line 38, delete "Y.qbset." and insert -- Y.qbset}]. --, therefor.

In Column 17, Line 21, delete "+(Cost" and insert -- +Cost --, therefor.

In Column 17, Line 43, delete "OPPTGG" and insert -- OPTGG --, therefor.

In Column 17, Line 45, delete "OPPTGG" and insert -- OPTGG --, therefor.

In Column 21, Line 6, delete "VMI" and insert -- VMM --, therefor.

In the Claims

In Column 26, Line 10, in Claim 15, after "instructions" insert -- include instructions --, therefor.

In Column 26, Line 18, in Claim 16, after "instructions" insert -- include instructions --, therefor.